United States Patent
Chen et al.

(10) Patent No.: US 12,046,105 B2
(45) Date of Patent: Jul. 23, 2024

(54) FREE-FOR-ALL GAME SESSION METHODS, SYSTEMS, AND APPARATUSES

(71) Applicant: Advanced New Technologies Co., Ltd., Grand Cayman (KY)

(72) Inventors: Yuerui Chen, Hangzhou (CN); Yanchun Zhu, Hangzhou (CN); Yang Li, Hangzhou (CN)

(73) Assignee: Advanced New Technologies Co., Ltd., Gran (KY)

( * ) Notice: Subject to any disclaimer, the term of this patent is extended or adjusted under 35 U.S.C. 154(b) by 604 days.

(21) Appl. No.: 16/707,749

(22) Filed: Dec. 9, 2019

(65) Prior Publication Data

US 2020/0118394 A1    Apr. 16, 2020

Related U.S. Application Data

(63) Continuation-in-part of application No. 15/018,646, filed on Feb. 8, 2016, now Pat. No. 10,505,922.

(30) Foreign Application Priority Data

Feb. 9, 2015    (CN) .......................... 201510068086.6

(51) Int. Cl.
*G07F 17/32*    (2006.01)
*A63F 13/30*    (2014.01)

(52) U.S. Cl.
CPC ............ *G07F 17/326* (2013.01); *A63F 13/30* (2014.09); *G07F 17/3204* (2013.01);
(Continued)

(58) Field of Classification Search
None
See application file for complete search history.

(56) References Cited

U.S. PATENT DOCUMENTS

| 5,344,199 A | 9/1994 | Carstens et al. |
| 6,175,823 B1 | 1/2001 | Van Dusen |

(Continued)

FOREIGN PATENT DOCUMENTS

| CN | 103295132 A | 9/2013 |
| CN | 103973769 A | 8/2014 |

(Continued)

OTHER PUBLICATIONS

The Japanese Office Action mailed on Dec. 24, 2019, for Japanese Patent Application No. 2017-539254, a counterpart foreign application of U.S. Appl. No. 15/018,646, 7 pages.
(Continued)

*Primary Examiner* — Jason T Yen
(74) *Attorney, Agent, or Firm* — Lee & Hayes, P.C.

(57) ABSTRACT

Methods, systems, and apparatuses are provided for implementing free-for-all game session participation and administration including creating a game session hosted at a social platform, issuing a plurality of prizes, populating the issued prizes with quantities of a commodity, setting a task as a precondition to claiming the issued prizes, awarding prizes to claiming users from whose respective user devices the social platform received successful claims based on performance of the task, and disbursing each awarded prize. Example embodiments of the present disclosure implement collective activities which encourage participation by groups of people affiliated by friend and/or group relationships using token or nominal commodity prizes to provide incentives, and furthermore provide token levels of challenge to provide participants with entertainment. Friends, family, colleagues, and other such extended groups of people may be incentivized to participate for the sake of collective low-stakes competition without extensive investment.

4 Claims, 7 Drawing Sheets

(52) U.S. Cl.
CPC ...... *G07F 17/3225* (2013.01); *G07F 17/3244* (2013.01); *G07F 17/3262* (2013.01); *G07F 17/3267* (2013.01)

(56) References Cited

U.S. PATENT DOCUMENTS

| | | | |
|---|---|---|---|
| 6,370,514 | B1 | 4/2002 | Messner |
| 7,478,143 | B1 | 1/2009 | Friedman et al. |
| 7,805,333 | B2 | 9/2010 | Kepecs |
| 9,669,296 | B1* | 6/2017 | Hibbert .............. A63F 13/5378 |
| 2007/0260522 | A1 | 11/2007 | Bice |
| 2008/0177726 | A1* | 7/2008 | Forbes ................ G06Q 30/02 707/999.005 |
| 2009/0270155 | A1* | 10/2009 | Glass .................... G07F 17/32 463/43 |
| 2009/0327129 | A1 | 12/2009 | Collas et al. |
| 2010/0151948 | A1* | 6/2010 | Vance ................. A63F 13/533 463/43 |
| 2010/0280921 | A1 | 11/2010 | Stone et al. |
| 2011/0069834 | A1 | 3/2011 | Urbanik et al. |
| 2011/0251962 | A1 | 10/2011 | Hruska |
| 2012/0157212 | A1* | 6/2012 | Kane ..................... G06F 3/0482 463/42 |
| 2012/0220377 | A1* | 8/2012 | Cantor ................. A63F 13/795 463/42 |
| 2012/0238351 | A1 | 9/2012 | Pyne et al. |
| 2013/0144732 | A1 | 6/2013 | Rothschild |
| 2013/0159190 | A1 | 6/2013 | Paintin |
| 2013/0275250 | A1* | 10/2013 | Rodell .............. G06Q 30/0208 705/26.1 |
| 2013/0288757 | A1* | 10/2013 | Guthridge ............. A63F 13/67 463/2 |
| 2014/0031130 | A1* | 1/2014 | Janakiraman ......... A63F 13/798 463/42 |
| 2014/0128162 | A1 | 5/2014 | Arafat et al. |
| 2014/0129428 | A1 | 5/2014 | Tyler et al. |
| 2014/0222977 | A1 | 8/2014 | Varney |
| 2014/0315639 | A1* | 10/2014 | Cao ......................... H04L 51/52 463/31 |
| 2015/0271162 | A1 | 9/2015 | Dulkin et al. |
| 2016/0234193 | A1 | 8/2016 | Chen et al. |

FOREIGN PATENT DOCUMENTS

| | | |
|---|---|---|
| CN | 104252613 A | 12/2014 |
| JP | H0965308 | 3/1997 |
| JP | 2006085445 | 3/2006 |
| JP | 2008257721 | 10/2008 |
| JP | 2009031995 | 2/2009 |
| JP | 2012027740 A | 2/2012 |
| JP | 2013186561 | 9/2013 |
| JP | 2014157430 | 8/2014 |
| KR | 20040008391 A | 1/2004 |
| KR | 20130082531 A | 7/2013 |

OTHER PUBLICATIONS

The Korean Office Action mailed on Feb. 5, 2020, for Korean Patent Application No. 2017-7021688, counterpart foreign application of U.S. Appl. No. 15/018,646, 12 pages.

The Japanese Office Action mailed on May 26, 2020 for Japanese Patent Application No. 2017-539254, a counterpart of U.S. Pat. No. 10,505,922, 2 pages.

Indian Office Action mailed on Sep. 29, 2020 for Indian Patent Application No. 201717024708, a counterpart of U.S. Pat. No. 10,505,922, 9 pages.

Written Opinion issued Apr. 3, 2020 by the Korea Patent Office in corresponding Application No. 10-2017-7021688, 4 pages.

English-language translation of Written Opinion issued Apr. 3, 2020 by the Korea Patent Office in corresponding Application No. 10-2017-7021688, 6 pages.

English tranlated Second Chinese Office Action mailed on Sep. 19, 2019 for Chinese Patent Application No. 201510068086.6, a counterpart foreign application of U.S. Appl. No. 15/018,646, 18 pages.

Translation of Chinese Office Action dated Feb. 3, 2019, from corresponding Chinese Patent Application No. 2015100680866, 9 pages.

Translation of Chinese Search Report dated Jan. 28, 2019, from corresponding Chinese Patent Application No. 2015100680866, 1 page.

Office Action issued Apr. 9, 2019 by the Japan Patent Office in corresponding Application No. 2017-539254, a counterpart of U.S. Appl. No. 15/018,646, 14 pages.

Office Action for U.S. Appl. No. 15/018,646, mailed on Feb. 9, 2018, Yuerui Chen, "Service Implementation Method, Payment Method and Apparatus", 22 pages.

Office Action for U.S. Appl. No. 15/018,646, mailed on Jun. 13, 2018, Yuerui Chen, "Service Implementation Method, Payment Method and Apparatus", 30 pages.

PCT Search Report and Written Opinion mailed Apr. 8, 2016 for PCT Application No. PCT/US16/17019, 9 pages.

Indian Hearing Letter mailed Jan. 30, 2024 for Indian Application No. 201717024708, a foreign counterpart to U.S. Pat. No. 10,505,922, 4 pages.

\* cited by examiner

INTERFACE 400

FREE-FOR-ALL GAME SESSION METHODS, SYSTEMS, AND APPARATUSES

CROSS REFERENCE TO RELATED PATENT APPLICATIONS

This application is a continuation in part of U.S. patent application Ser. No. 15/018,646, filed 8 Feb. 2016, entitled "Service Implementation Method, Payment Method and Apparatus," and claims priority to Chinese Patent Application No. 201510068086.6, filed on 9 Feb. 2015, entitled "Service Implementation Method, Payment Method and Apparatus," each of which is hereby incorporated by reference in its entirety.

BACKGROUND

Chinese New Year celebrations and other special occasions may entail the gift exchange of quantities of money in "red packets." More recently, with the advancement of social and messaging applications, this tradition has been recreated in a virtual setting. Social and messaging applications may provide a red packet platform wherein a user designates quantities of money as "virtual" red packets and sends the virtual red packets to other users. Each user may therefore take a quantity of money from virtual red packets received over the red packet platform.

The giving and receiving of red packets invokes traditional wishes for wealth and prosperity upon others in Chinese New Year celebrations. Thus, red packets do not just serve as a vehicle for money gifts, but are also widely associated, in a cultural context, with well-wishes and positive aspirations and sentiments. Therefore, red packets may be utilized in a variety of settings as motivation for participation in activities, expressed as the handing out of many quantities of nominal quantities of money to encourage participation in collective group activities involving high levels of mutual interaction. Thus, it is desirable to explore new applications of such collective group activities using means of interaction that do not exist in face-to-face activities.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Systems and methods discussed herein are directed to methods, systems, and apparatuses for a social free-for-all game, and more specifically to implementing methods, systems, and apparatuses implementing a game wherein a host user operates a host electronic device to issue multiple fungible prizes, and among multiple player users operating player electronic devices, each player user may claim one or more prizes on a free-for-all basis by completing a task, where the number of player users may exceed the number of prizes.

Figure 1:
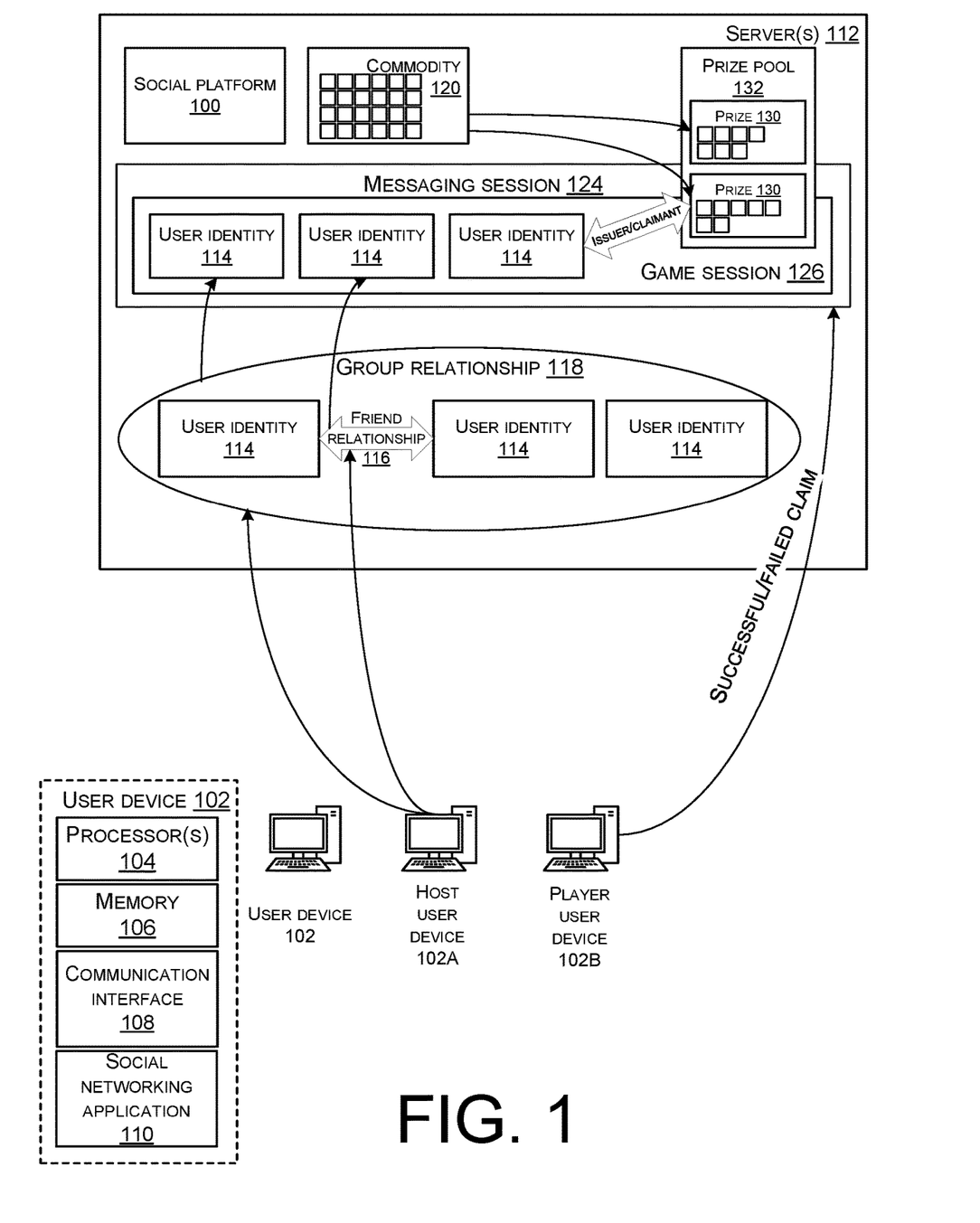
FIG. 1 illustrates an architecture diagram of a social platform and user devices according to example embodiments of the present disclosure.

FIG. 1 illustrates an architecture diagram of a social platform 100 and user devices 102 according to example embodiments of the present disclosure.

According to example embodiments of the present disclosure, a user device 102 may be an electronic device, a universal or dedicated computer system such as a personal computer, a server computer, a handheld device or a portable device, a tablet device, a multi-processor system, a microprocessor-based system, a set top box, a programmable consumer electronic device, a network PC, a microcomputer, a mainframe computer, and a distributed computing environment including any of the above systems or devices. A user device 102 may include one or more processor(s) 104, memory 106, and a communication interface 108. A social networking application may be stored in the memory and executable by the one or more processors to cause the user device 102 to communicate with a social platform 100 hosted at one or more server(s) 112 to request the social platform 100 to perform functions including, for example, create a user identity; create a friend relationship between a pair of user identities; create a group relationship among multiple user identities; add a user identity to a group relationship; create a message session; add a user identity to a messaging session; grant a quantity of a commodity to a user identity; transfer a quantity of a commodity from a first user identity to a second user identity; issue prizes; populate prizes with a quantity of a commodity; award a prize to a user identity; recover a quantity of a commodity from a prize; purge a prize; create a game session; and terminate a game session. The social networking application 110 may perform other functions suitable for messaging and social networking functions between users, not to be limited to those disclosed herein.

According to example embodiments of the present disclosure, a social platform 100 may be one or more online applications hosted by one or more server(s) 112, the applications providing functions including, for example, creating a user identity; creating a friend relationship between a pair of user identities; creating a group relationship among multiple user identities; adding a user identity to a group relationship; creating a messaging session; adding a user identity to a messaging session; granting a quantity of a commodity to a user identity; transferring a quantity of a commodity from a first user identity to a second user identity; issuing a prize; populating a prize with a quantity of a commodity; awarding a prize to a user identity; recovering a quantity of a commodity from a prize; purging a prize; creating a game session; and terminating a game session. A social platform 100 may perform other functions suitable for messaging and social networking functions between users, not to be limited to those disclosed herein.

According to example embodiments of the present disclosure, a user, such as a host user or a player user, may be a user having a user identity 114 on a social platform 100. A user identity 114 may include a username which identifies a corresponding user. A pair of user identities 114 may be related to each other by a friend relationship 116. Multiple user identities 114, such as more than two user identities 114, may be related to each other by a group relationship 118.

According to example embodiments of the present disclosure, a commodity 120 may be a digital object stored by the social platform 100, granted to a user identity 114 on the social platform 100, and transferred in a quantity between users of the social platform 100. A commodity 120 may be a plentiful digital object or may be a digital object corresponding to an external object existing in a plentiful quantity outside of the social platform. For example, a commodity 120 may be a unit of digital funds held by a financial account in a financial account system of the social platform 100, or may be a digital object representing a unit of currency held in a financial account or a blockchain-based distributed ledger outside of the social platform 100. According to example embodiments of the present disclosure, a unit of digital funds or a unit of currency may be nominal in value; for example, a unit of digital funds or a unit of currency may be valued at 1 cent in various currencies, so that a quantity thereof may be valued at any arbitrary denomination of cents.

According to example embodiments of the present disclosure, transfers of a commodity between users of the social platform 100 may occur among financial accounts in a financial account systems of the social platform 100 by, for example, database operations in a suitable database system such as any suitable Relational Database Management System ("RDBMS") or a distributed transaction in a blockchain-based distributed ledger, or may occur in a payment settlement system or a blockchain-based distributed ledger outside the social platform 100, or in any other manner suitable for transfer of nominal quantities of commodities. Furthermore, due to the quantities of commodities being transferred being nominal, transfers of quantities of a commodity between users of the social platform 100 may be held by the social platform 100 rather than executed immediately, and may be performed in batches, to reduce computation and communication overhead of processing many transfers in nominal quantities.

According to example embodiments of the present disclosure, something being plentiful means that quantities thereof are readily available for granting to user identities by the operation of methods and apparatuses according to example embodiments of the present disclosure, and would not likely be subject to scarcity as a result thereof. For example, units of digital funds or units of currency which are nominal in value may be plentiful because granting quantities of units of digital funds or units of currency in arbitrary denominations of cents is unlikely to deplete digital funds held in quantities much greater than nominal values by the social platform or in a financial account independent of the social platform. Alternatively, a commodity 120 may be plentiful because the social platform 100 or a source independent of the social platform 100 may regenerate (in the case that the commodity 120 is a digital object) or replenish (in the case that the commodity 120 is a digital object corresponding to an external object) arbitrary quantities of the commodity 120, or may regenerate or replenish sufficient quantities of the commodity 120 for repeated operations of methods, systems, and apparatuses according to example embodiments of the present disclosure.

According to example embodiments of the present disclosure, any user may operate a social networking application 110 running on a user device 102 to request the social platform 100 to create a user identity 114 of the user; create a friend relationship 116 between the user identity 114 of the user and a user identity 114 of another user; create a group relationship 118 among the user identity 114 of the user and any number of user identities 114 of other users; add a user identity 114 of another user to a group relationship 118 including a user identity 114 of the user; create a messaging session between user identities 114 of a friend relationship 116; and create a messaging session 124 between user identities 114 of a group relationship 118, in any suitable manner known to persons skilled in the art. A messaging session 124 may refer to one or more sets of protocols for a session established at a social platform 100 between multiple electronic devices, wherein any user operates a social networking application 110 running on any of the multiple user devices 102 to send a message including, for example, without limitation, text, images, audio, multimedia content, interactive content, or any other suitable content known to persons skilled in the art to another user operating a social networking application 110 running on any other of the multiple user devices 102.

According to example embodiments of the present disclosure, a free-for-all game may refer to one or more sets of protocols for a session established at a social platform 100 between a host user device 102A and multiple player user devices 102B, wherein a user of the host user device 102A operates a social networking application 110 running on the host user device 102A to request the social platform 100 to create a game session 126 allowing users of the player user devices 102B to compete with each other through user interactions upon the player user devices 102B. A game session 126 may be operated within a messaging session 124 or may be operated independent of a messaging session 124.

Upon receiving a request to create a game session 126, the social platform 100 may create a game session 126 hosted at the social platform 100 and accessible by any number of user devices 102 by protocols for a free-for-all game as described herein. The social platform 100 may further add a user identity 114 of the host user to the game session 126 and may add user identities 114 of multiple player users to the game session 126. Adding user identities 144 to the game session 126 is further described below.

According to one or more sets of protocols for a free-for-all game according to example embodiments of the present disclosure, in creating a game session 126, the social platform 100 may establish a goal for each player user of claiming from a prize source 128 in order to conditionally be awarded a prize 130 from a prize pool 132 associated with the prize source 128 by the social platform 100.

According to example embodiments of the present disclosure, a prize 130 may be a digital object which may be issued and purged by a social platform 100 and may be claimed by a player user. A host user may operate a social networking application 110 running on a host user device 102A to request the social platform 100 to issue prizes, whereupon the social platform 100 may issue prizes 130. Issuing prizes 130 may include setting an issuer relationship of prizes 130 to a user identity 114 of the host user (the "issuing user") and may include populating prizes 130 with a quantity of a commodity 120, as described in more detail below.

In response to a host user requesting the social platform 100 to issue prizes, the social platform 100 may issue multiple prizes 130, each prize 130 having an issue relationship to a user identity 114 of the issuing user. The social platform 100 may issue multiple prizes 130 in a prize pool 132 associated with a prize source 128, as further described below.

While requesting the social platform 100 to issue prizes, the host user may input a prize quantity into the social networking application 110 running on the host user device 102A. The social platform 100 may receive the input prize quantity from the host user device 102A, and, based thereon, may issue multiple prizes 130, the number of issued prizes 130 being equal to the input prize quantity. Alternatively, the host user may select one or more friend relationships 116 each of which includes a user identity 114 of the host user, or may select one or more group relationships 118 which includes a user identity 112 of the host user, within the social networking application 112 running on the host user device 102A. The social platform 100 may receive the selected one or more multiple friend relationships 116 or the selected one or more group relationships 118 from the host user device 102A, and, based thereon, may issue multiple prizes 130 which may be equal to or fewer in number than the number of users other than the host user among the selected one or more friend relationships 116 or equal to or fewer in number than the number of users other than the host user among the selected one or more group relationships 118. The social platform 100 may add user identities 114 included in the selected one or more friend relationships 116 and/or user identities 114 included in the selected one or more group relationships 118 to the game session 126.

While requesting the social platform 100 to issue prizes, the host user may input one or more commodity quantities into the social networking application 110 running on the host user device 102A. The social platform 100 may receive the one or more input commodity quantities from the host user device 102A, and, based thereon, may populate a prize 130 with a quantity of a commodity 120 equal to an input commodity quantity; may populate multiple prizes 130 each with a quantity of a commodity 120 equal to an input commodity quantity; or may divide an input commodity quantity into multiple commodity sub-quantities each less than the input commodity quantity, where the multiple commodity sub-quantities may be equal, unequal, or some equal and some unequal amongst each other, without limitation, and populate each of the multiple prizes 130 with a quantity of a commodity 120 equal to a sub-quantity among the multiple commodity sub-quantities.

Furthermore, while requesting the social platform 100 to issue prizes, the host user may create, or cause to be generated, a task to be performed by player users as a precondition for claiming one of the issued prizes. Performance of such tasks and evaluation of whether such tasks have been performed correctly is described subsequently.

Figure 2:
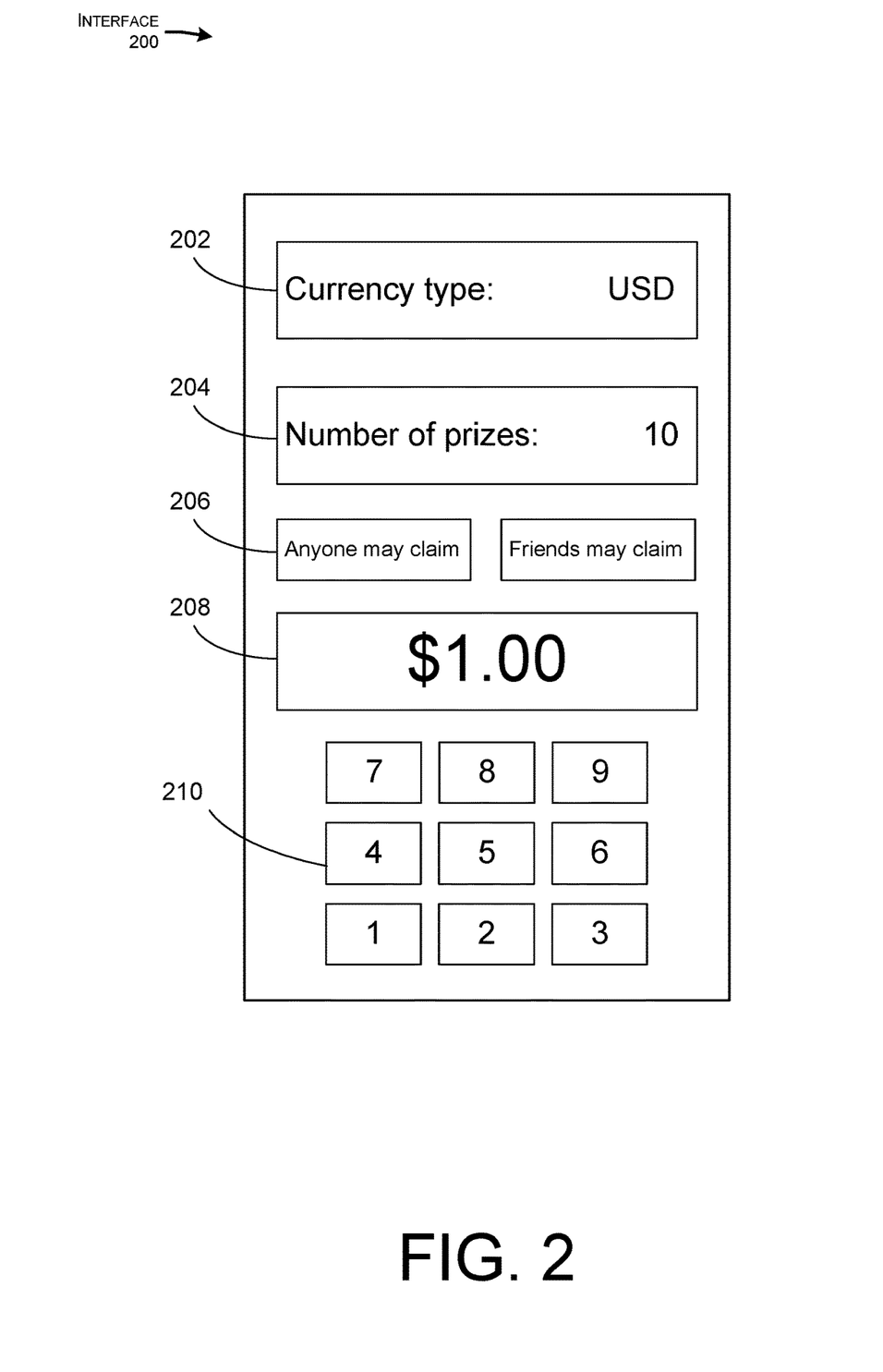
FIG. 2 illustrates an example interface of a display for inputting prize and commodity quantities on a host user device.

The host user may select a type of task to be performed on the social networking application 110 running on the host user device 102A. As will be described in further detail below, a task may be to view a sequence of numbers, letters, or, generally, alphanumeric symbols or any other symbols displayed on a user device 102 as described herein, and replicate the sequence by inputting the same symbols on an input device of the user device 102. Thus, selections of type of task may include, for example, to view and input a sequence of numbers, and to view and input a sequence of characters. Since input keypads (such as illustrated in FIG. 2 below) on mobile device tend to be primarily numeric or primarily alphabetical, a sequence of numbers may not include characters, and a sequence of characters may not include numbers, so that users do not have to switch between different keyboards on a mobile device.

The host user creating a task or causing a task to be generated may include the host user inputting, on the host user device 102A, a sequence of numbers or characters which player users should correctly input on player user devices 102B as a precondition for claiming one of the issued prizes. However, it may be unnecessary for the host user to manually input a sequence of numbers, since computers are more effective in generating random and arbitrary sequences of numbers than humans. At the same time, it may be preferable for the host user to manually input a sequence of characters, since arbitrary sequences of characters may be significantly difficult to read, and would unnecessarily elevate the challenge of performing a task (where challenge as a concept is described below). Moreover, the host user may manually input a sequence of characters which are meaningful based on the particular friend relationships 116 and group relationships 118 selected as described above, in the manner of a passphrase. For example, the passphrase may be a greeting to friends, a greeting to all members of a group, a greeting based on a holiday or event being collectively commemorated among friends or a group, and the like.

Thus, the host user creating a task or causing a task to be generated may alternatively include the host user requesting, on the host user device 102A, the social platform 100 to generate a sequence of numbers or characters which player users should correctly input on player user devices 102B. As reasoned above, it may be preferable for the social platform 100 to generate a sequence of numbers over characters.

A generated task may be dynamic, and a manually created task may be non-dynamic, for the purpose of subsequent discussion.

Additionally, protocols of a game session 126 may further require that a task be unique for that particular game session 126. This relates to example embodiments of the present disclosure wherein player users may claim an issued prize merely by performing the task without making any other contextual selections, as described below. A task may be unique for a game session 126 if, for example, a sequence of numbers or characters as described above is not reused for tasks of any other game sessions 126 hosted on the social platform 100. Such a guarantee may be enforced by, for example, storing sequences previously dynamically generated for other tasks. The sequences may be stored in a data structure that can be quickly accessed to check for the presence of a value, such as a hash table, a Bloom filter, and the like. Upon generation of a sequence, the social platform 100 may check the data structure to determine whether the sequence is already stored in the data structure; if not, the social platform 100 may determine that the sequence is unique and suitable as a task, and may store the sequence in the data structure. Upon expiration of a sequence (such as upon expiry of a lifespan of a game session 126 or expiration of a time limit as described herein), the social platform 100 may delete the sequence from the data structure (in the event that the sequence supports deletion therefrom).

However, the guarantee of uniqueness may not be indefinite in duration, and may only be true during a period of time, such as a period of time while the game session 126 is active and before it has been terminated. Furthermore, the game session 126 may have a lifespan before it is automatically terminated, and the guarantee of uniqueness may only be valid during the lifespan. Moreover, the guarantee of uniqueness may only apply to dynamic tasks, as the social platform 100 may not guarantee the uniqueness of a task if it was created by the host user.

FIG. 2 illustrates an example interface 200 of a display for inputting prize and commodity quantities on a host user device 102A.

At 202, FIG. 2 illustrates a commodity type selection field wherein a host user may select one of a plurality of commodity types for populating prizes. For example, a commodity type may be any among various legal tenders, cryptocurrencies, or other fungible, plentiful object such as a digital object as described herein.

At 204, FIG. 2 illustrates a prize quantity input field wherein a host user may input a prize quantity.

At 206, FIG. 2 illustrates a relationship toggle. A host user may toggle the relationship toggle to limit user identities that may claim prizes from the game session 126. A host user may toggle the relationship toggle to specify that any user identity 114, regardless of relationship, may be added to the game session; however, a host user may, for example, limit user identities 114 to those in friend relationships 116 or group relationships 118 with the host user.

At 208, FIG. 2 illustrates a commodity quantity input field wherein a host user may input a commodity quantity.

At 210, FIG. 2 illustrates an on-screen keypad by which a host user may input some of the information described above.

A source of quantities of a commodity 120 may be a financial account of a user as established by the social platform 100 or outside the social platform 100 as described above. Populated quantities of a commodity 120 may be held or denoted as held by the social platform 100 until such later time that the quantities of a commodity 120 are to be disbursed, as described below. Alternatively, quantities of a commodity 120 may be granted to the host user for use in the game session 126 for no cost in exchange. This may be feasible due to the nominal values of the quantities entailed according to example embodiments of the present disclosure.

A player user may claim from a prize source 128 by operating a social networking application 110 running on a player user device 102B, details of which are further described below. A claim by a player user from a prize source 128 may succeed or fail; if the claim succeeds, the social platform 100 may award a prize 130 to a user identity 114 of the player user (the "claiming user"). Awarding a prize 130 to a user identity 114 may include setting a claimant relationship of the prize 130 to the user identity 114 and may result in transferring a quantity of a commodity from another user identity 114 to the user identity 114, as described in further detail below. A claimant relationship of the prize 130 may remain not set to any user identity 114 for as long as a prize 130 is not claimed.

According to example embodiments of the present disclosure, a user claiming from a prize source 128 means the user operating a social networking application 110 running on a player user device 102B to view and select a prize source 128, and request a social platform 100 to award one among multiple fungible prizes 130 to the user from the prize source 128. That is to say, claiming from a prize source 128 need not entail claiming a particular prize 130. Thus, a user claiming a prize 130 from a prize source 128 may view and select a game session 126, view and select a user identity 114 of a host user added to a game session 126, view and select a user identity 114 of a user issuing a prize 130 added to a game session 126, view and select a user identity 114 identified by a friend relationship 116, or view and select a user identity 114 identified by a group relationship 118, and in each case the selected game session 126 or user identity 114 shall be referred to as a prize source 128 for the purpose of example embodiments of the present disclosure (where selection, in each case, may be made from among one or more instances of different prize sources 128 being viewed), Thus, a user claiming a prize 130 does not select a particular prize 130 or select a quantity of commodities 120 populated in a prize 130, and may not be able to view a particular prize 130 or view a quantity of commodities 120 populated in a prize 130.

As described above, user identities 114 may be added to the game session 126. In such cases, user identities 114 not added to the game session 126 may not be able to select the game session 126 as a prize source.

For the purpose of claiming a prize 130 from a prize source 128, prizes 130 that may be awarded by the social platform 100 in response to a claim by a user ("awardable prizes") may be presented alongside information of the prize source 128 collectively, or in a uniform manner, so that they appear fungible. For example, the social platform 100 may send a number of awardable prizes 130 in a prize pool 132 associated with a viewed prize source 128 to a player user device 102B of the user alongside information of the viewed prize source 128, causing a social networking application 110 running on the player user device 102B to display the number of awardable prizes 130 alongside information of the viewed prize source 128, where the social networking application 110 may not display a quantity of a commodity 120 that each awardable prize 130 is populated with.

Awarding a prize 130 to a user identity 114 may be contingent upon whether a claim by a user succeeds or fails, wherein the claim may succeed if, among one or more preconditions, all preconditions are met, and the claim may fail if a precondition is not met. According to example embodiments of the present disclosure, a precondition may be correct performance of a task by a claiming user before, while, or after claiming from a prize source 128. In the case that the claiming user performs the task before claiming from the prize source 128, the claiming user correctly performing the task may cause the social networking application 110 to send the claim to the social platform 100, and the claiming user failing to perform the task or incorrectly performing the task may cause the social networking application 110 to decline to send the claim to the social platform 100, or send the claim to the social platform 100 as a failed claim rather than as a successful claim. In the case that the claiming user performs the task after claiming from the prize source 128, the social networking application 110 may send a result of whether the claiming user has performed the task correctly to the social platform 100 to cause the social platform 100 to determine whether a prize 130 may be awarded to the claiming user.

If a claiming user performs a task correctly, another precondition may be that awardable prizes 130 remain in the prize pool 132 associated with the prize source 128 when the social platform 100 receives the claim. Therefore, a claim may fail even if a claiming user performs a task correctly if no awardable prizes 130 remain in the prize pool 132 associated with the prize source 128 when the social platform 100 receives the claim.

If a claim succeeds, the social platform 100 may receive a successful claim and may award a prize 130 to a user identity 114 of the claiming user. The awarded prize 130 may thereafter be made non-awardable by removal of the awarded prize 130 from the prize pool 132 associated with the prize source 128, or by the awarded prize 130 being flagged as non-awardable. The social platform 100 may record the user identity 114 of the claiming user, and may record a time at which the prize 130 was awarded.

Moreover, in order to select a prize source 128, a user claiming a prize 130 may merely perform a task, and according to these example embodiments of the present disclosure, the task may be guaranteed to be unique with regard to a game session 126 as described above, if it is dynamic. Thus, the performance of the task (for example, the viewing and input of a particular sequence of numbers or characters) uniquely identifies a game session 126 and a prize source 128, and the performance of the task shall constitute selecting a prize source 128.

As described above, user identities 114 may be added to the game session 126. In such cases, user identities 114 not added to the game session 126 may be unable to select the game session 126 as a prize source 128 even upon successful performance of a task.

Furthermore, failure to perform the task correctly may fail to select a prize source 128, since, if a prize source 128 is uniquely identified by a task (i.e., a sequence of numbers or characters), an incorrectly input sequence of numbers or characters will fail to identify the prize source 128.

According to one or more protocols for a free-for-all game according to example embodiments of the present disclosure, the social platform 100 may establish a goal for each player user in a game session 126, the goal being making a claim from a prize source 128 in order to conditionally be awarded a prize 130 from a prize pool 132 associated with the prize source 128 by the social platform 100. Upon the prize pool 132 associated with a prize source 128 being depleted of awardable prizes 130, player user devices 102B viewing the game session 126 or viewing user identities 114 added to the game session 126 may no longer be able to select the game session 126 or those user identities 114 as prize sources 128 from which to make a claim. The respective prize source 128, whether a game session 126 or a user identity 114, may be displayed on player user devices 102B as having no awardable prizes 130 remaining. Alternatively, the respective prize source 128, whether a game session 126 or a user identity 114, may be removed from display on player user device 102B altogether.

In the event that any outstanding claims by claiming users remain upon the prize pool 132 associated with a prize source 128 being depleted of awardable prizes 130 (that is, the claims have been made to the social platform 100 and have not failed based on a precondition but have not yet succeeded in time, or the claims have succeeded but prizes 130 have not yet been rewarded to user identities 114 of the respective claiming users), the social platform 100 may cause all such outstanding claims to fail, and may send notifications to each respective player user device 102B of the claiming users indicating that such outstanding claims have failed due to unavailability of awardable prizes 130.

The social platform 100 may thereafter terminate the game session 126 and remove all user identities 114 from the game session 126. Alternatively, the social platform 100 may leave the game session 126 open, so that any user having a user identity 114 added to the game session 126 may request the social platform 100 to issue prizes, restarting the process as described above. Moreover, the social platform 100 may terminate the game session 126 after a lifespan of the game session 126 elapses. Upon termination of the game session 126, any and all tasks generated for the game session 126 will no longer be recognized by the social platform 100 for claiming prizes 130, and guarantees of uniqueness for the game session 126 will no longer apply.

Upon termination of the game session 126, or at any time when a prize pool 132 has no awardable prizes 130 therein, or at any time after a prize 130 has been awarded, the social platform 100 may disburse each awarded prize 130. Disbursing an awarded prize 130 may include the social platform 100 determining both the issuing user and the claiming user set for the awarded prize 130; determining a quantity of a commodity 120 that the prize 130 is populated with; and performing a transfer of the quantity of the commodity 120 from control of the issuing user to control of the claiming user. As described above, transfers may be executed in batches rather than executed immediately in order to reduce computation and communication overhead.

As described above, according to example embodiments of the present disclosure, transfers of a commodity between users of the social platform 100 may occur among financial accounts in a financial account systems of the social platform 100 by, for example, database operations in a suitable database system such as any suitable RDBMS or a distributed transaction in a blockchain-based distributed ledger, or may occur in a payment settlement system or a blockchain-based distributed ledger outside the social platform 100, or in any other manner suitable for transfer of nominal quantities of commodities. Thus, disbursement of an awarded prize 130 may be performed by the social platform 100 performing database transactions or distributed transactions among financial accounts of the social platform 100. Alternatively, disbursement of an awarded prize 130 may be performed by the social platform 100 by connecting to interfaces of payment settlement systems or distributed ledgers outside the social platform 100 and providing instructions thereto by calls to the interfaces.

It is possible that the host user may claim prizes 130 issued by the host user. This may, for example, serve the purpose of "cleaning up" unclaimed prizes 130. Regardless of the purpose of such claims, such claims may be treated just as any other claims; however, it may be unnecessary for such claims to be disbursed since no transfer of quantities of a commodity would result. Thus, while disbursing each awarded prize 130, if the issuing user and the claiming user have the same user identity 114 for a particular prize 130, disbursement may be skipped for that prize 130.

Upon closure of the game session 126 by the social platform 100, in the event that any prizes 130 remain in the prize pool 132, the social platform 100 may purge the remaining prizes 130 by removing them from the prize pool 132, and release the user identity 114 of the issuing user from having an issuer relationship to the prizes 130. This may prevent transfers of quantities of commodities for unwarranted reasons after the game session 126 has already ended.

Figure 3:
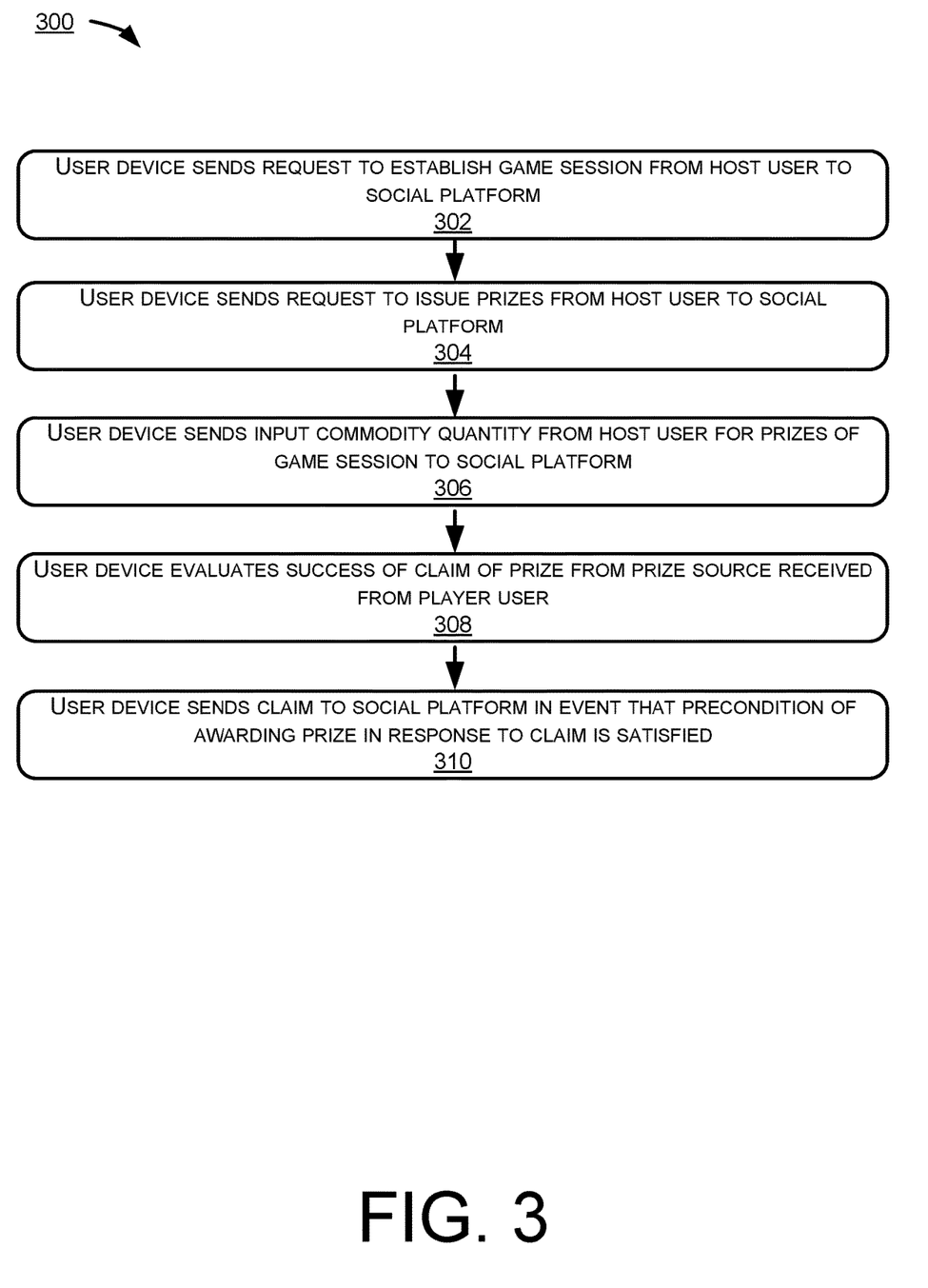
FIG. 3 illustrates a free-for-all game session method according to example embodiments of the present disclosure.

FIG. 3 illustrates a free-for-all game session participation method 300 according to example embodiments of the present disclosure.

At a step 302, a user device sends a request to create a game session from a host user to a social platform.

The host user may send the request to a social platform 100 by operating a host user device 102A as described above. A game session 126 may be created by the social platform 100 and hosted by the social platform 100 as described above.

At a step 304, the user device sends a request to issue prizes from a host user to the social platform.

As described above, the host user need not necessarily request the social platform 100 to add user identities 114 to the game session 126 prior to requesting the social platform 100 to issue prizes. Moreover, the host user need not necessarily manually add user identities 114 to the game session 126. Instead, the host user may merely select one or more friend relationships 116 each of which includes a user identity 114 of the host user, or may select one or more group relationships 118 which includes a user identity 112 of the host user. These actions may both cause user identities 114 to be added to the game session 126 and cause the social platform 100 to issue prizes 130 (determining a number of prizes to be issued in the process, as described above). Alternatively, the host user may operate the host user device 102A to input a prize quantity, as described above. However, in this case, the host user may still add user identities 114 to the game session 126 by selecting friend relationships 116 and group relationships 118.

At a step 306, the user device sends an input commodity quantity from the host user for prizes of the game session to the social platform.

At a step 308, the user device evaluates success of a claim of a prize from a prize source received from a player user.

As described above, a player user may claim from a prize source 128 by operating a social networking application 110 running on a player user device 102B, details of which are further described below. A claim by a player user from a prize source 128 may succeed or fail; if the claim succeeds, the social platform 100 may award a prize 130 to a user identity 114 of the claiming user. Awarding a prize 130 to a user identity 114 may include setting a claimant relationship of the prize 130 to the user identity 114 and may result in transferring a quantity of a commodity from another user identity 114 to the user identity 114, as described in further detail below. A claimant relationship of the prize 130 may remain not set to any user identity 114 for as long as a prize 130 is not claimed.

Furthermore, as described above, awarding a prize 130 to a user identity 114 may be contingent upon whether a claim by a user succeeds or fails, wherein the claim may succeed if, among one or more preconditions, all preconditions are met, and the claim may fail if a precondition is not met.

At a step 310, the user device sends the claim to the social platform in the event that a precondition of awarding a prize in response to the claim is satisfied.

According to example embodiments of the present disclosure, a precondition may be correct performance of a task by a claiming user before, while, or after claiming from a prize source 128. Whether a task is performed correctly or not, according to example embodiments of the present disclosure, is described below.

According to example embodiments of the present disclosure, a task may include a sequence of actions manually performed upon a user device 102. An action may be, for example, an input performed by hand upon an input device of the user device 102. An action may have a variable, such as information or content that is input by the action. A task may have challenge. For the purpose of this disclosure, challenge may mean that human error is probable in performing one or more actions of the task or in correctness of respective variables of the one or more actions. Human error may occur in performance of one or more actions of a task and/or in correctness of respective variables of one or more actions of the task, and human error may occur in the performance, in the correctness, in both the performance and the correctness, or in neither the performance nor the correctness of each individual task.

For example, a task may be to view a sequence of numbers, letters, or, generally, alphanumeric symbols or any other symbols displayed on a user device 102 as described herein, and replicate the sequence by inputting the same symbols on an input device of the user device 102. Symbols of a sequence according to example embodiments of the present disclosure may be any symbols that may be input through conventional input interfaces and input devices of user devices 102 as described herein.

Figure 4:
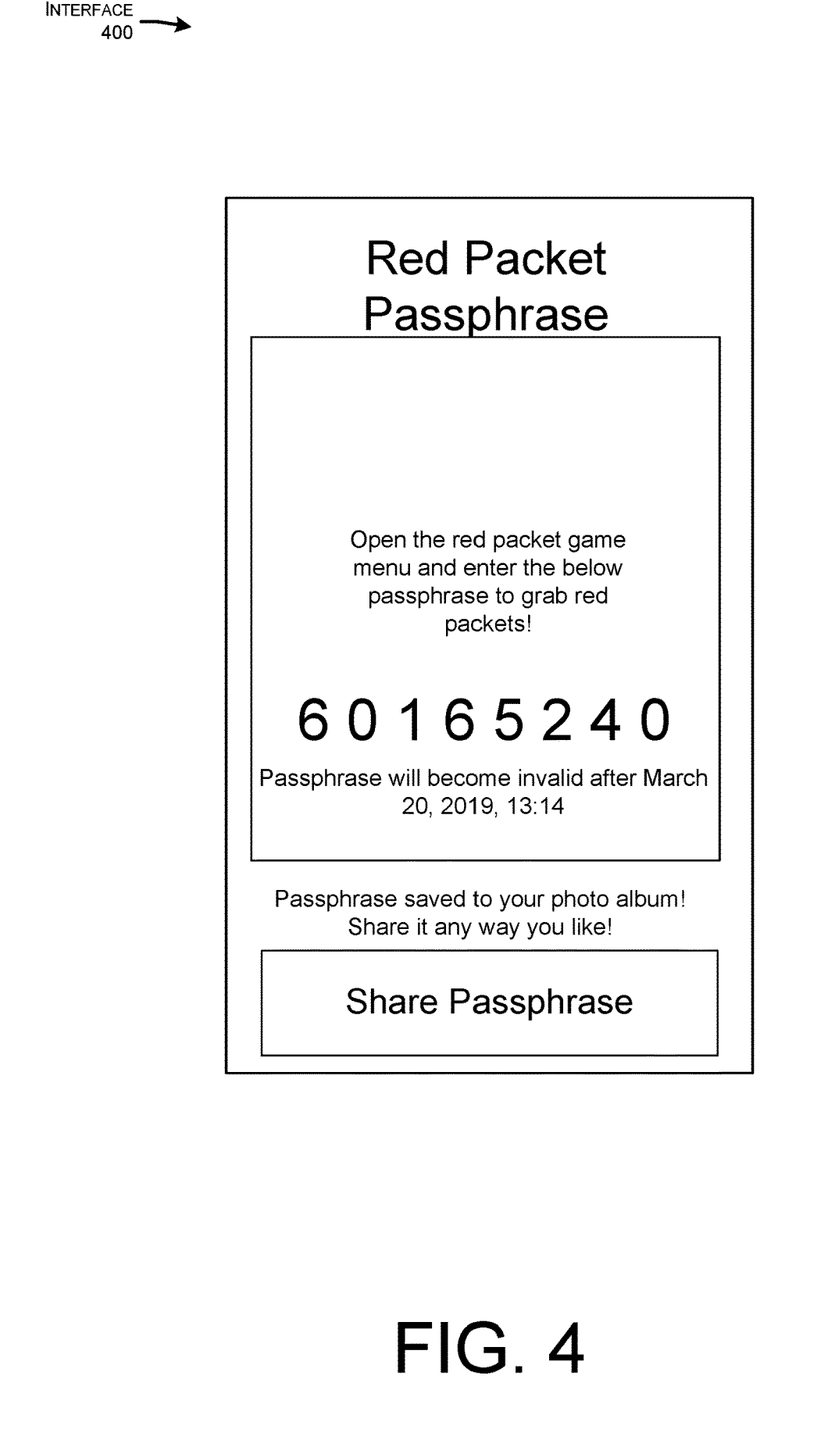
FIG. 4 illustrates an example layout of a prompt for a player user to perform a task on a player user device according to example embodiments of the present disclosure.

FIG. 4 illustrates an example layout of a prompt for a player user to perform a task on a player user device according to example embodiments of the present disclosure. As illustrated by FIG. 4, the prompt may include a display of a sequence of numbers or characters. Moreover, the symbols displayed may be displayed in the form of an image rather than text, so that the symbols displayed cannot be copied and pasted, obviating challenge of the task. Moreover, the symbols may be obfuscated in various ways, such as addition of visual elements, variation of positions, addition of colors, obscuration, and the like, to increase challenge of the task.

The prompt of FIG. 4 further communicates that a game session 126 has a lifespan lasting until Mar. 20, 2019, 13:14.

The prompt of FIG. 4, according to example embodiments of the present disclosure, may be displayed on the host user device 102A rather than on the player user devices 102B. Thus, the host user may need to manually convey the prompt of FIG. 4 to each player user by means such as instant messaging, email, manual exchange of displayed information on a screen, spoken word, and the like. The host user device 102A may save the prompt locally in image format so as to create a portable file facilitating the conveyance of the prompt by these means. The prompt of FIG. 4 further prompts the host user to manually convey the prompt of FIG. 4 by any means desired. FIG. 4 may further provide a control, such as the "Share Passphrase" button illustrated, which may link to a selection of messaging applications facilitating the host user to share the prompt with other users.

In order to provide challenge to such a task, according to example embodiments of the present disclosure, time for completion of the task may be limited. Both a failure to both perform the task within a time limit and a failure to correctly perform the task within a time limit may lead to failure in performing the task. By imposing a time limit on performing the task, a user performing the task may be challenged in aspects such as visual perception, memory, speed, and dexterity.

According to example embodiments of the present disclosure, the social networking application 110 may cause the player user device 102B of the claiming user to display a notification to the claiming user to perform a task, and may begin tracking a time limit within which the claiming user is to perform the task. In the case that the claiming user fails to perform the task or incorrectly performs the task within the time limit (during which the claiming user may attempt to correctly perform the task a limited or unlimited number of times, according to various example embodiments of the present disclosure), the social networking application 110 may deem the claiming user to have failed to perform the task and proceed as described above, and may proceed accordingly.

In the case that the claiming user the claiming user correctly performing the task may cause the social networking application 110 to send the claim to the social platform 100, and the claiming user failing to perform the task or incorrectly performing the task may cause the social networking application 110 to decline to send the claim to the social platform 100. In the case that the claiming user performs the task after claiming from the prize source 128, the social networking application 110 may send a result of whether the claiming user has performed the task correctly to the social platform 100 to cause the social platform 100 to determine whether a prize 130 may be awarded to the claiming user.

Alternatively, the social platform 100, in response to receiving a claim made by a claiming user from a player user device 102B, may cause the player user device 102B to display the notification and may track the time limit. However, in the interest of minimizing latency, these steps may be performed by the social networking application 110 at the user device 102 side.

Claiming a prize may succeed or fail, as described above. Any user may claim one or more prizes 130, including the host user; thus, the host user may also be a player user according to step 308. Nothing shall prevent or limit the capability of users to claim prizes 130 except the extent to which unclaimed prizes 130 remain in the prize pool 132 and the expiration of a time limit making a task impossible to complete.

Upon expiration of a time limit, the task may be re-generated. For example, it is no longer desirable for the same sequence of numbers to remain valid after expiration of a time limit. Thus, upon expiration of the time limit, the social platform 100 may generate a new task (for example, to generate a new sequence of numbers), maintaining guarantees of uniqueness with regard to tasks previously generated in the game session 126.

Subsequent to the steps of the method 300 (for example, when the social platform 100 has terminated the game session 126 and removed all user identities 114 from the game session 126), the host user and all player users may view outcomes of the game session 126 on respective host user device 102A and player user devices 102B. For example, the host user may view a summary of each user identity 114 of claiming users who made claims from either the game session 126 or the host user as a prize source, and a time when each claim was made. The host user may further view whether each claim was successful or not.

Figure 5:
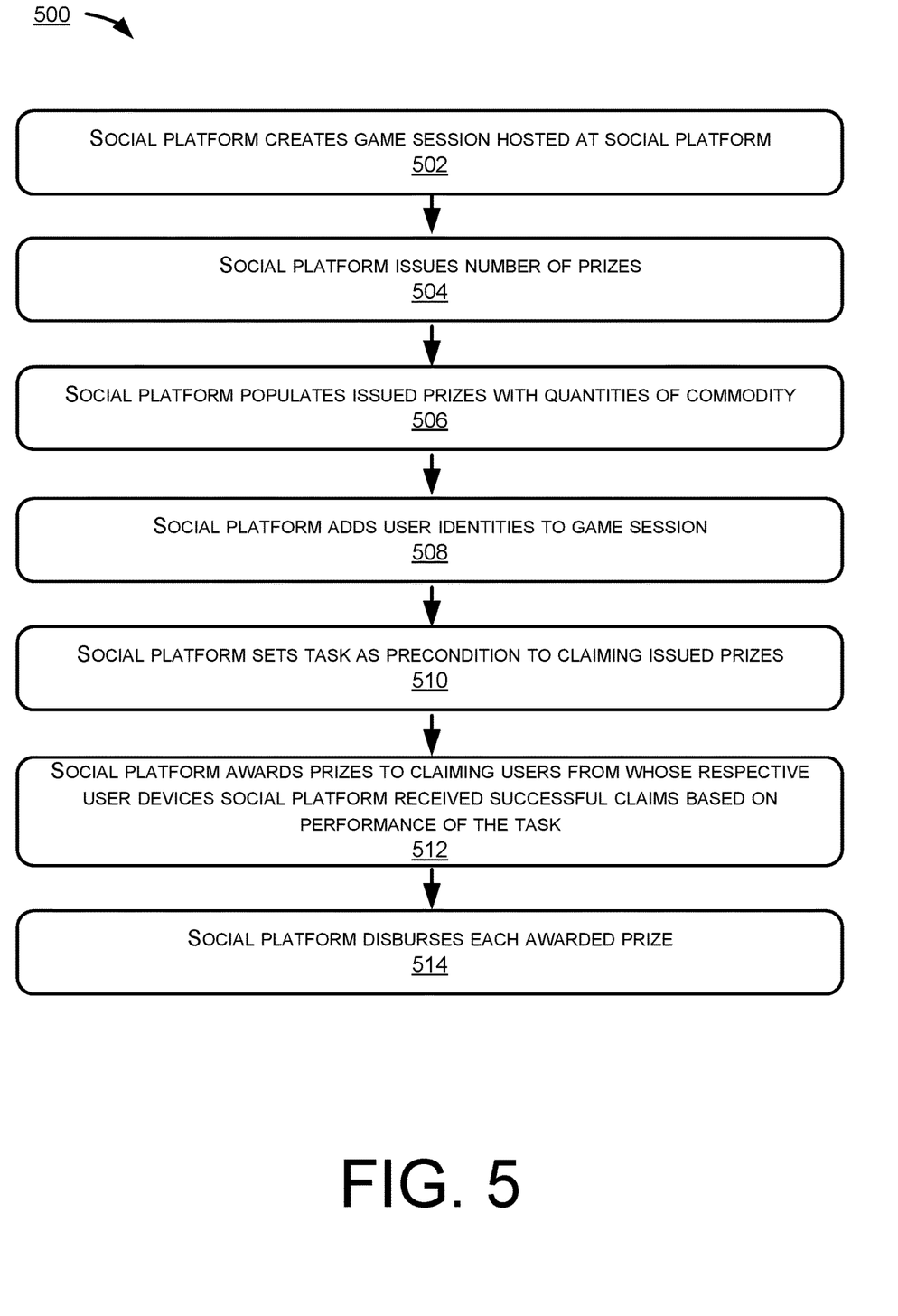
FIG. 5 illustrates a free-for-all game administration method according to example embodiments of the present disclosure.

FIG. 5 illustrates a free-for-all game administration method 500 according to example embodiments of the present disclosure.

At step 502, a social platform creates a game session hosted at the social platform.

As described above, social platform 100 may be one or more online applications hosted by one or more servers 112, the applications providing functions including, for example, creating a user identity; creating a friend relationship between a pair of user identities; creating a group relationship among multiple user identities; adding a user identity to a group relationship; creating a messaging session; adding a user identity to a messaging session; granting a quantity of a commodity to a user identity; transferring a quantity of a commodity from a first user identity to a second user identity; issuing a prize; populating a prize with a quantity of a commodity; awarding a prize to a user identity; recovering a quantity of a commodity from a prize; purging a prize; creating a game session; and terminating a game session. A social platform 100 may perform other functions suitable for messaging and social networking functions between users, not to be limited to those disclosed herein.

A host user may send the request to a social platform 100 by operating a host user device 102A as described above. A game session 126 may be created by the social platform 100 and hosted by the social platform 100 as described above.

As described above, upon receiving a request to create a game session 126, the social platform 100 may create a game session 126 hosted at the social platform 100 and accessible by any number of user devices 102 by protocols for a free-for-all game as described herein.

At step 504, the social platform issues a number of prizes.

As described above, in a request to issue prizes, the host user device 102A may send a prize quantity to the social platform 100. Based thereon, the social platform 100 may issue multiple prizes 130, the number of issued prizes 130 being equal to the input prize quantity. Alternatively, the host user device may send one or more friend relationships 116 each of which includes a user identity 114 of the host user, or may send one or more group relationships 118 which includes a user identity 112 of the host user, to the social platform 100. Based thereon, the social platform 100 may issue multiple prizes 130 which may be equal to or fewer in number than the number of users other than the host user among the selected one or more friend relationships 116 or equal to or fewer in number than the number of users other than the host user among the selected one or more group relationships 118.

At step 506, the social platform populates the issued prizes with quantities of a commodity.

As described above, the social platform 100 may receive one or more input commodity quantities from the host user device 102A, and, based thereon, may populate a prize 130 with a quantity of a commodity 120 equal to an input commodity quantity; may populate multiple prizes 130 each with a quantity of a commodity 120 equal to an input commodity quantity; or may divide an input commodity quantity into multiple commodity sub-quantities each less than the input commodity quantity, where the multiple commodity sub-quantities may be equal, unequal, or some equal and some unequal amongst each other, without limitation, and populate each of the multiple prizes 130 with a quantity of a commodity 120 equal to a sub-quantity among the multiple commodity sub-quantities.

At step 508, the social platform adds user identities to the game session.

As described above, the social platform 100 may add user identities 114 included in the received one or more friend relationships 116 and/or user identities 114 included in the received one or more group relationships 118 to the game session 126, whether received with a request to issue prizes or received separately as a request to add user identities to the game session (the user identities being identified by the friend relationships and/or group relationships) in the case that user identities that may claim prizes from the game session have been limited.

At step 510, the social platform sets a task as a precondition to claiming the issued prizes.

As described above in more detail, the host user may select a type of task, and may create the task or cause the social platform 100 to generate the task.

At step 512, the social platform awards prizes to claiming users from whose respective user devices the social platform received successful claims based on performance of the task.

As described above, user devices 102 may send successful claims to the social platform 100 under certain conditions. Failed claims may or may not be sent to the social platform 100. In either regard, in response to receiving successful claims, the social platform 100 may award a prize 130 to a user identity 114 of the player user (the "claiming user"). Awarding a prize 130 to a user identity 114 may include setting a claimant relationship of the prize 130 to the user identity 114 and may result in transferring a quantity of a commodity from another user identity 114 to the user identity 114, as described in further detail below. A claimant relationship of the prize 130 may remain not set to any user identity 114 for as long as a prize 130 is not claimed.

At step 514, the social platform disburses each awarded prize.

As described above, disbursing an awarded prize 130 may include the social platform 100 determining both the issuing user and the claiming user set for the awarded prize 130; determining a quantity of a commodity 120 that the prize 130 is populated with; and performing a transfer of the quantity of the commodity 120 from control of the issuing user to control of the claiming user. As described above, transfers may be executed in batches rather than executed immediately in order to reduce computation and communication overhead.

The timing of disbursing each awarded prize, and manners of transferring quantities of a commodity between user identities, are as described above with reference to FIG. 1.

Figure 6:
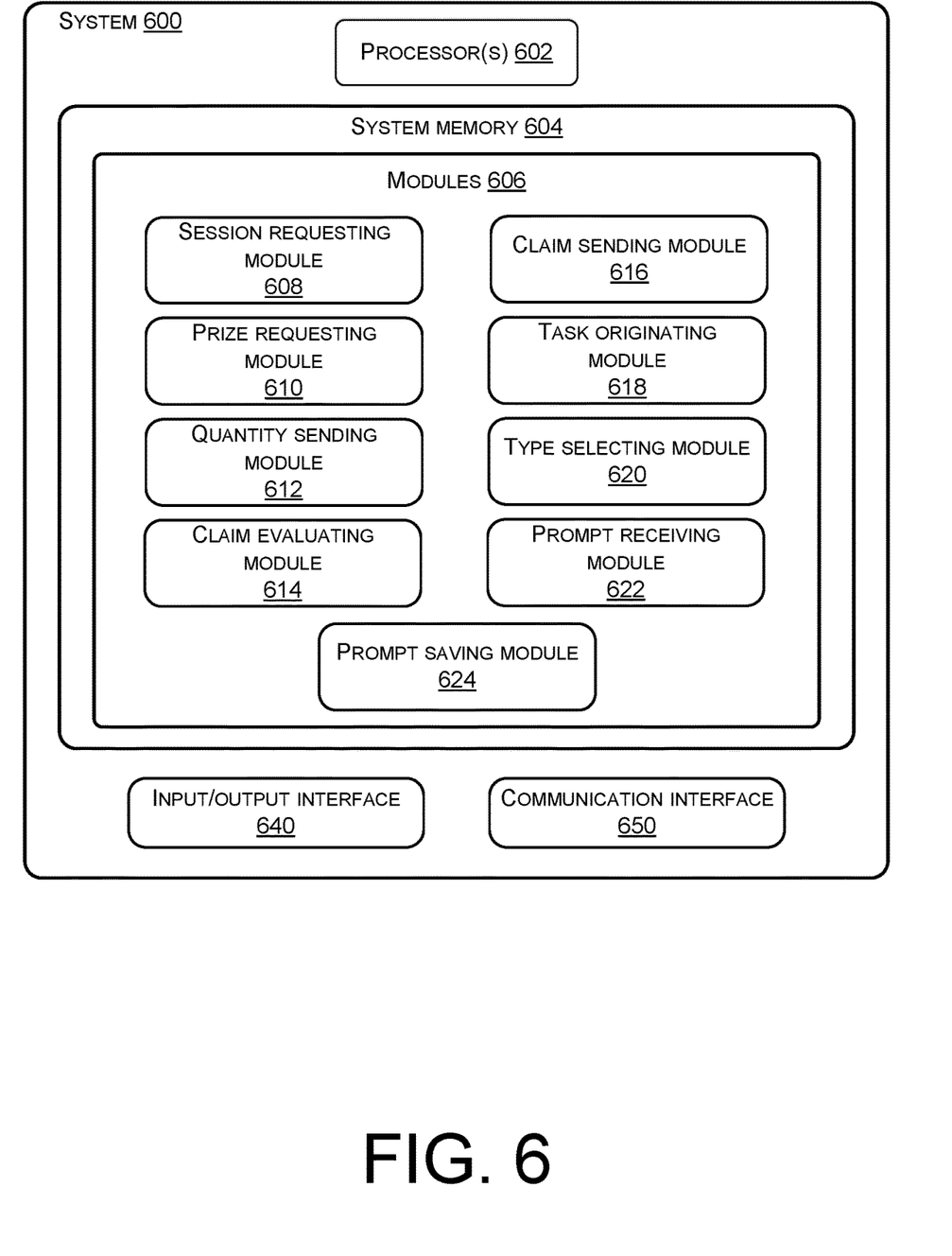
FIG. 6 illustrates an example apparatus for implementing the processes and methods described above for implementing user devices, including host and player user devices, for free-for-all game session participation.

FIG. 6 illustrates an example apparatus 600 for implementing the processes and methods described above for implementing user devices, including host and player user devices, for free-for-all game session participation.

The techniques and mechanisms described herein may be implemented by multiple instances of the apparatus 600 as well as by any other computing device, system, and/or environment. The apparatus 600 shown in FIG. 6 is only one example of a system and is not intended to suggest any limitation as to the scope of use or functionality of any computing device utilized to perform the processes and/or procedures described above. Other well-known computing devices, systems, environments and/or configurations that may be suitable for use with the embodiments include, but are not limited to, personal computers, server computers, hand-held or laptop devices, multiprocessor systems, microprocessor-based systems, set top boxes, game consoles, programmable consumer electronics, network PCs, minicomputers, mainframe computers, distributed computing environments that include any of the above systems or devices, implementations using field programmable gate arrays ("FPGAs") and application specific integrated circuits ("ASICs"), and/or the like.

The apparatus 600 may include one or more processors 602 and apparatus memory 604 communicatively coupled to the processor(s) 602. The processor(s) 602 may execute one or more modules and/or processes to cause the processor(s) 602 to perform a variety of functions. In some embodiments, the processor(s) 602 may include a central processing unit ("CPU"), a graphics processing unit ("GPU"), both CPU and GPU, or other processing units or components known in the art. Additionally, each of the processor(s) 602 may possess its own local memory, which also may store program modules, program data, and/or one or more operating systems.

Depending on the exact configuration and type of the apparatus 600, the apparatus memory 604 may be volatile, such as RAM, non-volatile, such as ROM, flash memory, miniature hard drive, memory card, and the like, or some combination thereof. The apparatus memory 604 may include one or more computer-executable modules 606 that are executable by the processor(s) 602.

The modules 606 may include, but are not limited to, a session requesting module Communication interface 108, a prize requesting module 610, a quantity sending module 612, a claim evaluating module 614, a claim sending module 616, a task originating module 618, a type selecting module 620, The session requesting module 608 may be configured to send a request to create a game session from a host user to a social platform, as described above with reference to FIG. 3.

The prize requesting module 610 may be configured to send a request to issue prizes from a host user to the social platform, as described above with reference to FIG. 3.

The quantity sending module 612 may be configured to send an input commodity quantity from the host user for prizes of the game session to the social platform, as described above with reference to FIG. 3.

The claim evaluating module 614 may be configured to evaluate success of a claim of a prize from a prize source received from a player user, as described above with reference to FIG. 3.

The claim sending module 616 may be configured to send the claim to the social platform in the event that a precondition of awarding a prize in response to the claim is satisfied, as described above with reference to FIG. 3.

The task originating module 618 may be configured to create, or request a social platform to generate, a task to be performed by player users as a precondition for claiming one of the issued prizes, as described above with reference to FIG. 1.

The type selecting module 620 may be configured to send a selection of a type of task to be performed to the social platform, as described above with reference to FIG. 1.

The prompt receiving module 622 may be configured to receive a prompt for performing the task.

The prompt saving module 624 may be configured to save the prompt in image format.

Figure 7:
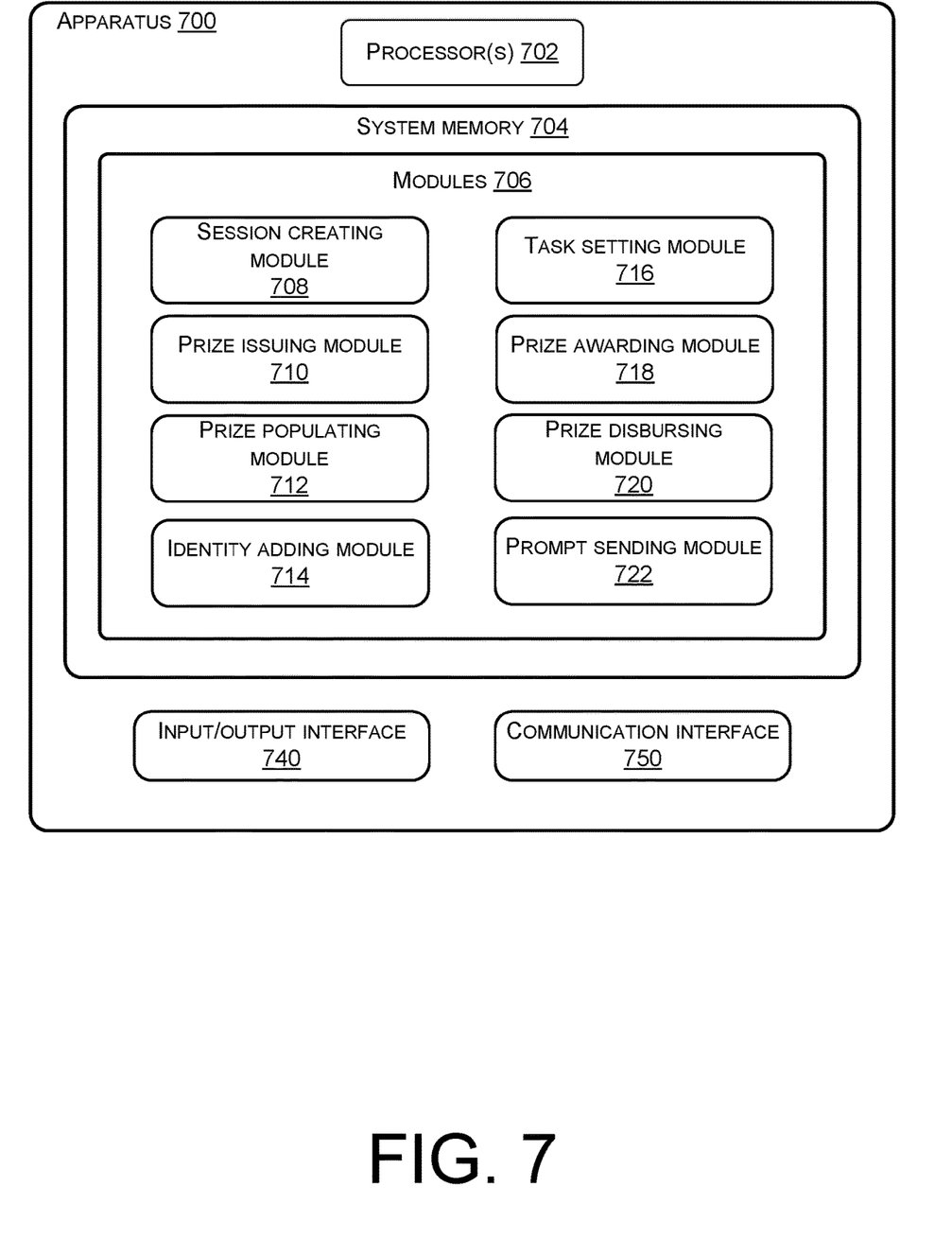
FIG. 7 illustrates an example system for implementing the processes and methods described above for implementing free-for-all game session administration by a social platform.

The apparatus 600 may additionally include an input/output ("I/O") interface 640 for receiving input data for evaluating whether a task is correctly performed, and for receiving each other type of input as described above. The apparatus 600 may also include a communication module 650 allowing the apparatus 600 to communicate with a system such as system 700 described below hosting a social platform 100, over a network (not shown). The network may include the Internet, wired media such as a wired network or direct-wired connections, and wireless media such as acoustic, radio frequency ("RF"), infrared, and other wireless media.

FIG. 7 illustrates an example system 700 for implementing the processes and methods described above for implementing free-for-all game session administration by a social platform.

The techniques and mechanisms described herein may be implemented by multiple instances of the system 700 as well as by any other computing device, system, and/or environment. The system 700 shown in FIG. 7 is only one example of a system and is not intended to suggest any limitation as to the scope of use or functionality of any computing device utilized to perform the processes and/or procedures described above. Other well-known computing devices, systems, environments and/or configurations that may be suitable for use with the embodiments include, but are not limited to, personal computers, server computers, hand-held or laptop devices, multiprocessor systems, microprocessor-based systems, set top boxes, game consoles, programmable consumer electronics, network PCs, minicomputers, mainframe computers, distributed computing environments that include any of the above systems or devices, implementations using FPGAs and application specific integrated circuits ASICs, and/or the like.

The system 700 may include one or more processors 702 and system memory 704 communicatively coupled to the processor(s) 702. The processor(s) 702 may execute one or more modules and/or processes to cause the processor(s) 702 to perform a variety of functions. In some embodiments, the processor(s) 702 may include a CPU, a GPU, both CPU and GPU, or other processing units or components known in the art. Additionally, each of the processor(s) 702 may possess its own local memory, which also may store program modules, program data, and/or one or more operating systems.

Depending on the exact configuration and type of the system 700, the system memory 704 may be volatile, such as RAM, non-volatile, such as ROM, flash memory, miniature hard drive, memory card, and the like, or some combination thereof. The system memory 704 may include one or more computer-executable modules 706 that are executable by the processor(s) 702.

The modules 706 may include, but are not limited to, a session creating module 708, a prize issuing module 710, a prize populating module 712, an identity adding module 714, a task setting module 716, a prize awarding module 718, a prize disbursing module 720, and a prompt sending module 722.

The session creating module 708 may be configured to create a game session hosted at the social platform, as described above with reference to FIG. 5.

The prize issuing module 710 may be configured to issue a number of prizes, as described above with reference to FIG. 5.

The prize populating module 712 may be configured to populate the issued prizes with quantities of a commodity, as described above with reference to FIG. 5.

The identity adding module 714 may be configured to add user identities to the game session, as described above with reference to FIG. 5.

The task setting module 716 may be configured to set a task as a precondition to claiming issued prizes, as described above with reference to FIG. 5.

The prize awarding module 718 may be configured to award prizes to claiming users from whose respective user devices the social platform received successful claims, as described above with reference to FIG. 5.

The prize disbursing module 720 may be configured to disburse each awarded prize, as described above with reference to FIG. 5.

The prompt sending module 722 may be configured to send a prompt as described above with reference to FIG. 4 to a host user device.

The system 700 may additionally include an I/O interface 740. The system 700 may also include a communication module 750 allowing the system 700 to communicate with apparatuses such as apparatus 600 described above, implementing user device such as a host user device or a player user device, over a network (not shown). The network may include the Internet, wired media such as a wired network or direct-wired connections, and wireless media such as acoustic, RF, infrared, and other wireless media.

Some or all operations of the methods described above can be performed by execution of computer-readable instructions stored on a computer-readable storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

The computer-readable storage media may include volatile memory (such as random-access memory ("RAM")) and/or non-volatile memory (such as read-only memory ("ROM"), flash memory, etc.). The computer-readable storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer-readable storage medium is an example of computer-readable media. Computer-readable media includes at least two types of computer-readable media, namely computer-readable storage media and communications media. Computer-readable storage media includes volatile and non-volatile, removable and non-removable media implemented in any process or technology for storage of information such as computer-readable instructions, data structures, program modules, or other data. Computer-readable storage media includes, but is not limited to, phase change memory ("PRAM"), static random-access memory ("SRAM"), dynamic random-access memory ("DRAM"), other types of RAM, ROM, electrically erasable programmable read-only memory ("EEPROM"), flash memory or other memory technology, compact disk read-only memory ("CD-ROM"), digital versatile disks ("DVD") or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer-readable storage media do not include communication media.

The computer-readable instructions stored on one or more non-transitory computer-readable storage media that, when executed by one or more processors, may perform operations described above with reference to FIGS. 1-7. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

By the abovementioned technical solutions, the present disclosure provides methods, systems, and apparatuses are provided for implementing free-for-all game session participation and administration including creating a game session hosted at a social platform, issuing a plurality of prizes, populating the issued prizes with quantities of a commodity, adding user identities to the game session, awarding prizes to claiming users from whose respective user devices the social platform received successful claims, and disbursing each awarded prize. Example embodiments of the present disclosure implement collective activities which encourage participation by groups of people affiliated by friend and/or group relationships using token or nominal commodity prizes to provide incentives, and furthermore provide token levels of challenge to provide participants with entertainment. Friends, family, Gcolleagues, and other such extended groups of people may be incentivized to participate for the sake of collective low-stakes competition without extensive investment.

Example Clauses

A. A method comprising: creating a game session hosted at a social platform; issuing a plurality of prizes; populating the issued prizes with quantities of a commodity; setting a task as a precondition to claiming the issued prizes; awarding prizes to user identities of claiming users from whose respective user devices the social platform received successful claims based on performance of the task; and disbursing each awarded prize.

B. The method as paragraph A recites, wherein the task comprises viewing a sequence of symbols dynamically generated by the social platform and inputting the sequence of symbols on a player user device.

C. The method as paragraph B recites, wherein setting the task guarantees uniqueness of the task during the game session.

D. The method as paragraph B recites, wherein the task further comprises a time limit as a precondition to claiming the issued prizes.

E. The method as paragraph D recites, further comprising setting a new task as a precondition to claiming the issued prizes upon expiration of a time limit of a task.

F. The method as paragraph A recites, further comprising sending a prompt for performing the task in image format to a host user device which requested creating the game session.

G. The method as paragraph A recites, wherein the task comprises viewing a sequence of symbols manually input by a host user operating a host user device which requested creating the game session and inputting the sequence of symbols on a player user device.

H. The method as paragraph A recites, wherein the one or more friend relationships each comprises a user identity of a host user, and the plurality of prizes issued is equal to or fewer in number than a number of user identities other than the user identity of the host user among the one or more friend relationships.

I. The method as paragraph A recites, wherein the one or more group relationships each comprises a user identity of a host user, and the plurality of prizes issued is equal to or fewer in number than a number of user identities other than the user identity of the host user among the one or more group relationships.

J. The method as paragraph A recites, further comprising receiving one or more input commodity quantities from a host user device, and, based thereon, populating a prize with a quantity of a commodity equal to an input commodity quantity populating a prize with a sub-quantity of a commodity less than the input commodity quantity.

K. The method as paragraph J recites, wherein different prizes are each populated with one among a plurality of sub-quantities of a commodity, wherein the plurality of sub-quantities are equal, unequal, or some equal and some unequal amongst each other.

L. The method as paragraph A recites, wherein user identities added to the game session are user identities included in one or more friend relationships received from a host user device or user identities included in one or more group relationships received from a host user device.

M. The method as paragraph A recites, wherein awarding a prize to a user identity comprises setting a claimant relationship of the prize to the user identity.

N. The method as paragraph A recites, wherein disbursing an awarded prize comprises determining an issuing user and a claiming user set for the awarded prize; determining a quantity of a commodity that the prize is populated with; and performing a transfer of the quantity of the commodity from control of the issuing user to control of the claiming user.

O. The method as paragraph N recites, wherein a plurality of transfers of quantities of the commodity are performed in a batch.

P. The method as paragraph A recites, wherein disbursing an awarded prize is performed after each issued prize is awarded.

Q. A system comprising: one or more processors and memory communicatively coupled to the one or more processors, the memory storing computer-executable modules executable by the one or more processors that, when executed by the one or more processors, perform associated operations, the computer-executable modules including: a session creating module configured to create a game session hosted at a social platform; a prize issuing module configured to issue a plurality of prizes; a prize populating module configured to populate the issued prizes with quantities of a commodity; an identity adding module configured to add user identities to the game session; a task setting module configured to set a task as a precondition to claiming the issued prizes; a prize awarding module configured to award prizes to user identities of claiming users from whose respective user devices the social platform received successful claims; and a prize disbursing module configured to disburse each awarded prize.

R. The system as paragraph Q recites, wherein the task comprises viewing a sequence of symbols dynamically generated by the social platform and inputting the sequence of symbols on a player user device.

S. The system as paragraph R recites, wherein the task setting module is further configured to guarantee uniqueness of the task during the game session.

T. The system as paragraph R recites, wherein the task further comprises a time limit as a precondition to claiming the issued prizes.

U. The system as paragraph T recites, wherein the task setting module is further configured to set a new task as a precondition to claiming the issued prizes upon expiration of a time limit of a task.

V. The system as paragraph Q recites, further comprising a prompt sending module configured to send a prompt for performing the task in image format to a host user device which requested creating the game session.

W. The system as paragraph Q recites, wherein the task comprises viewing a sequence of symbols manually input by a host user operating a host user device which requested creating the game session and inputting the sequence of symbols on a player user device.

X. The system as paragraph Q recites, wherein the one or more friend relationships each comprises a user identity of a host user, and the plurality of prizes issued is equal to or fewer in number than a number of user identities other than the user identity of the host user among the one or more friend relationships.

Y. The system as paragraph Q recites, wherein the one or more group relationships each comprises a user identity of a host user, and the plurality of prizes issued is equal to or fewer in number than a number of user identities other than the user identity of the host user among the one or more group relationships.

Z. The system as paragraph Y recites, wherein the prize populating module is configured to populate different prizes each with one among a plurality of sub-quantities of a commodity, wherein the plurality of sub-quantities are equal, unequal, or some equal and some unequal amongst each other.

AA. The system as paragraph Q recites, wherein the identity adding module is configured to add user identities included in one or more friend relationships received from a host user device or user identities included in one or more group relationships received from a host user device to the game session.

BB. The system as paragraph Q recites, wherein awarding a prize to a user identity comprises setting a claimant relationship of the prize to the user identity.

CC. The system as paragraph Q recites, wherein the prize disbursing module is configured to disburse an awarded prize by determining an issuing user and a claiming user set for the awarded prize; determining a quantity of a commodity that the prize is populated with; and performing a transfer of the quantity of the commodity from control of the issuing user to control of the claiming user.

DD. The system as paragraph CC recites, wherein the prize disbursing module is configured to perform a plurality of transfers of quantities of the commodity in a batch.

EE. The system as paragraph Q recites, wherein the prize disbursing module is configured to disburse an awarded prize is performed after each issued prize is awarded.

FF. An apparatus comprising: one or more processors and memory communicatively coupled to the one or more processors, the memory storing computer-executable modules executable by the one or more processors that, when executed by the one or more processors, perform associated operations, the computer-executable modules including: a session creating module configured to send a request to create a game session from a host user to a social platform; a prize requesting module configured to send a request to issue prizes from a host user to the social platform; a quantity sending module configured to send an input commodity quantity from the host user for prizes of the game session to the social platform; a claim evaluating module configured to evaluate success of a claim of a prize from a prize source received from a player user; and a claim sending module configured to send the claim to the social platform in the event that a precondition of awarding a prize in response to the claim is satisfied.

GG. The apparatus as paragraph FF recites, further comprising a task originating module configured to create, or request a social platform to generate, a task to be performed by player users as a precondition for claiming one of the issued prizes.

HH. The apparatus as paragraph GG recites, further comprising a type selecting module configured to send a selection of a type of task to be performed to the social platform.

II. The apparatus as paragraph HH recites, wherein the task comprises viewing a sequence of symbols dynamically generated by the social platform and inputting the sequence of symbols on a player user device.

JJ. The apparatus as paragraph HH recites, wherein the task comprises viewing a sequence of symbols manually input by a host user operating the apparatus, and inputting the sequence of symbols on a player user device.

KK. The apparatus as paragraph FF recites, further comprising a prompt receiving module configured to receive a prompt for performing the task.

LL. The apparatus as paragraph W recites, further comprising a prompt saving module configured to save the prompt in image format.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. An apparatus comprising:
one or more processors; and
memory communicatively coupled to the one or more processors, the memory storing computer-executable modules executable by the one or more processors that, when executed by the one or more processors, perform associated operations, the computer-executable modules including:
a session requesting module configured to send a request to create a game session from a host user to a social platform, the game session comprising user identities included in one or more friend relationships each including a user identity of the host user;
a quantity sending module configured to send an input commodity quantity from the host user for prizes of the game session to the social platform;
a task originating module configured to create, or request a social platform to generate, a task to be performed by player users as a precondition for claiming one of the issued prizes, the task comprising viewing a sequence of symbols dynamically generated by the social platform and inputting the sequence of symbols on a player user device;
a type selecting module configured to send a selection of a type of task to be performed to the social platform;
a claim evaluating module configured to evaluate success of a claim of a prize from a prize source received from a player user; and
a claim sending module configured to send the claim to the social platform in the event that a precondition of awarding a prize in response to the claim is satisfied.

2. The apparatus of claim 1, wherein the task comprises viewing a sequence of symbols manually input by a host user operating the apparatus and inputting the sequence of symbols on a player user device.

3. The apparatus of claim 1, further comprising a prompt receiving module configured to receive a prompt for performing the task.

4. The apparatus of claim 3, further comprising a prompt saving module configured to save the prompt in image format.

* * * * *